United States Patent
Fritsch et al.

(10) Patent No.: US 11,671,035 B2
(45) Date of Patent: Jun. 6, 2023

(54) METHOD FOR OPERATING A SYSTEM COMPRISING AT LEAST TWO MECHANICALLY COUPLED ASYNCHRONOUS MOTORS, COMPUTER PROGRAM CONTAINING AN IMPLEMENTATION OF THE METHOD AND SYSTEM OPERATING IN ACCORDANCE WITH THE METHOD

(71) Applicant: Siemens Aktiengesellschaft, Munich (DE)

(72) Inventors: Christoph Fritsch, Pommersfelden (DE); Stefan Rupprecht, Postbauer-Heng (DE); Martin Streubühr, Zirndorf (DE); Bernd Wedel, Möhrendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 108 days.

(21) Appl. No.: 17/431,647

(22) PCT Filed: Feb. 19, 2020

(86) PCT No.: PCT/EP2020/054281
§ 371 (c)(1),
(2) Date: Aug. 17, 2021

(87) PCT Pub. No.: WO2020/169631
PCT Pub. Date: Aug. 27, 2020

(65) Prior Publication Data
US 2022/0140756 A1    May 5, 2022

(30) Foreign Application Priority Data
Feb. 21, 2019  (EP) ..................... 19158479

(51) Int. Cl.
*H02P 5/00* (2016.01)
*H02P 23/14* (2006.01)

(52) U.S. Cl.
CPC ................. *H02P 5/00* (2013.01); *H02P 23/14* (2013.01)

(58) Field of Classification Search
CPC ............. H02P 5/00; H02P 23/14; H02P 5/747
(Continued)

(56) References Cited

U.S. PATENT DOCUMENTS

| 4,329,636 A | 5/1982 | Uchida et al. |
| 7,327,111 B2 * | 2/2008 | Rastogi ................... H02P 25/22 318/807 |

(Continued)

FOREIGN PATENT DOCUMENTS

| DE | 2845952 A1 | 4/1980 |
| EP | 2527248 A2 | 11/2012 |
| EP | 3306803 A1 | 4/2018 |

OTHER PUBLICATIONS

Wang Aimeng et al: "An accurate active power sharing study in virtual flux angle droop method"; IECON 2017—43rd Annual Conference of the IEEE Industrial Electronics Society, IEEE; Oct. 29, 2017; pp. 756-761, XP033279636, DOI: 10.1109/IECON.2017. 8216131.

(Continued)

*Primary Examiner* — David Luo
(74) *Attorney, Agent, or Firm* — Henry M. Feiereisen LLC

(57) ABSTRACT

A method for operating a system having at least two mechanically coupled asynchronous motors, a computer program implementing the method and a system operating in accordance with the method are disclosed. One asynchronous motor is selected as master, with the other asynchro- (Continued)

nous motor(s) selected as slave(s). An effective (master) flux angle is measured in the motor selected as master and used as a basis for a setpoint value for controlling the flux angle of every other motor (slave) in the system. The flux angle of every slave motor is adjusted to the setpoint value as part of the control operation.

9 Claims, 1 Drawing Sheet

(58) Field of Classification Search
USPC .................................................. 318/445, 34
See application file for complete search history.

(56) References Cited

U.S. PATENT DOCUMENTS

| 2007/0035263 A1 | 2/2007 | Rastogi et al. |
| 2012/0018578 A1 | 1/2012 | Polcuch |
| 2013/0033215 A1 | 2/2013 | Krishnamurthy et al. |
| 2015/0021441 A1 | 1/2015 | Matsui |

OTHER PUBLICATIONS

PCT International Search Report and Written Opinion of the International Searching Authority dated Jun. 22, 2021 corresponding to PCT International Application No. PCT/ EP2020/054281 filed Feb. 19, 2021.

* cited by examiner

METHOD FOR OPERATING A SYSTEM COMPRISING AT LEAST TWO MECHANICALLY COUPLED ASYNCHRONOUS MOTORS, COMPUTER PROGRAM CONTAINING AN IMPLEMENTATION OF THE METHOD AND SYSTEM OPERATING IN ACCORDANCE WITH THE METHOD

CROSS-REFERENCES TO RELATED APPLICATIONS

This application is the U.S. National Stage of International Application No. PCT/EP2020/054281, filed Feb. 19, 2020, which designated the United States and has been published as International Publication No. WO 2020/169631 A1 and which claims the priority of European Patent Application, Serial No. 19158479.6, filed Feb. 21, 2019, pursuant to 35 U.S.C. 119(a)-(d).

BACKGROUND OF THE INVENTION

The invention relates to a method for operating a system comprising at least two mechanically coupled asynchronous motors, a computer program containing an implementation of the method and a system operating in accordance with the method. The at least two mechanically coupled asynchronous motors are sometimes also referred to as motors for short hereinafter. The type of motor is always the type of asynchronous motor (other designation: asynchronous machine, induction motor, induction machine). The motors can be mechanically coupled in any manner, for example, multi-winding motors, a plurality of sub-motors in a motor housing, motors on the same shaft, motors that operate on a gearbox, motors that are coupled via a workpiece, and so on.

Mechanically coupled asynchronous motors introduce their individual torque ripple into a respective mechanical system as a disruptive torsional force. As an example of a system with at least two mechanically coupled asynchronous motors, reference can be made to a cross cutter driven by means of two asynchronous motors, in which the cutting blades sometimes twist so strongly due to torsional forces that there are significant quality differences in the cutting pattern of, for example, paper or corrugated cardboard. Regardless of such undesirable quality differences, the oscillating torsional forces reduce the service life of the cutting blades of such a cross cutter.

Asynchronous motors have a ripple in the torque, in a similar manner to permanently excited synchronous motors. In the case of synchronous motors, these harmonic frequencies of the rotor speed are caused by the grooving of the stator lamination. In the case of asynchronous motors, these ripples also occur during operation. They are caused by the active magnetization of the rotor and depend on the flux angle and the rotor angle. The ripple in the torque also causes a ripple in the terminal voltage due to energy conservation. By measuring the terminal voltage, the ripple can be made particularly clearly visible.

In coupled asynchronous motors which are each driven by a separate converter, each motor introduces its torque ripple into the respective mechanical system, for example a cross cutter in which the two rotating cutting blades (upper blade, lower blade) are each driven by a motor. The course of this ripple results from a superposition of the ripples originating from the individual motors and depends on the position of the individual flux angles of each motor. However, the flux angles of the two motors are not correlated with one another but in each case result from internal variables of each individual motor, such as for example, current, voltage and temperature. This means that a difference in the flux angle of the motor, and thus a ripple of the torque output in each case, for example, depends on a switch-on sequence and changes or at least can change during operation.

A difference in the flux angle only occurs in the regulation of asynchronous machines. In contrast to the field-oriented regulation of synchronous machines, the absolute rotor position angle does not have to be transformed here, but a relative speed must be determined between the stator field and the rotor speed. This is the so-called slip speed or slip frequency.

A common calculation of a transformation angle of an asynchronous motor is the addition of the current rotor position angle to the integral of the slip frequency. The current slip frequency is calculated from the desired torque multiplied by the quotient of the current rotor resistance at the estimated current temperature and the square of the main flux of the motor: $\omega_s = M_{spt} R_r / \psi^2$. As the variables rotor resistance $R_r$ and actual flux value $\psi$ are operating variables of the individual motors, they may differ from drive to drive.

An object of the invention consists in specifying a method and a system that works according to the method and comprises at least two mechanically coupled asynchronous motors, in which torque ripples are avoided or at least reduced in a simple manner.

SUMMARY OF THE INVENTION

This object is achieved according to the invention by means of a method for flux angle regulation as set forth hereinafter. For this purpose, in a method for operating a system comprising at least two mechanically coupled asynchronous motors, for example, a cross cutter, the following is provided: one of the at least two asynchronous motors is selected as the master and functions as the master during operation of the system. The asynchronous motor or any other asynchronous motor functions as the slave during operation of the system. With regard to the asynchronous motor functioning as the master, a respectively effective flux angle (master flux angle) is detected in a continuous or quasi-continuous manner. A detection of the master flux angle means in particular a metrological detection (by means of a corresponding sensor system), a calculation (for example, on the basis of a model calculation) or a readout of internal operands of a converter connected upstream of the asynchronous motor. The detected flux angle effective at the master is included in a setpoint value for regulating the flux angle of the or each slave. In the case of the or each asynchronous motor functioning as a slave, the flux angle (slave flux angle) effective there is adapted to the setpoint value by means of the regulation (flux angle regulation).

The aforementioned object is likewise achieved by means of a system with at least two mechanically coupled asynchronous motors, in that a flux angle regulator is assigned to the at least two mechanically coupled asynchronous motors, wherein by means of the flux angle regulator at least one flux angle can be regulated and/or by means of the flux angle regulator at least one flux angle is regulated during operation of the system. The flux angle regulator comprises an implementation of the method described here and below, possibly with individual or a plurality of preferred, but fundamentally optional additions, in particular additions which are described below as preferred embodiments. The flux angle regulator is predetermined by corresponding configuration of the asynchronous motor functioning as the master. For the or each further motor of the system, it is implicitly certain that this motor or these motors function as slaves within the system, and with the configuration of the asynchronous motor functioning as the master, the configuration of the or each further motor is thus also determined as a slave. In the case of the asynchronous motor functioning as the master, the flux regulator detects the respectively effective flux angle (master flux angle) in a continuous or quasi-continuous manner, or the respectively effective master flux angle is supplied to the flux regulator without the flux regulator itself initiating the detection or being involved in the detection. By means of the flux regulator, the master flux angle can therefore be detected or the master flux angle can be supplied to the flux regulator. Likewise, in the case of the or each asynchronous motor functioning as a slave, the flux regulator detects the respectively effective flux angle (slave flux angle) in a continuous or quasi-continuous manner, or the flux regulator is supplied with the respectively effective slave flux angle without the flux regulator itself initiating the detection or being involved in the detection. By means of the flux regulator, the slave flux angle can therefore be detected, or the slave flux angle can be supplied to the flux regulator. With regard to the detection of the flux angles (master flux angle, slave flux angle), what has been said above applies and accordingly the term "detect" includes in particular a metrological detection (by means of a corresponding sensor system), a calculation (for example, on the basis of a model calculation) or a readout of internal operands of a converter connected upstream of the asynchronous motor.

The master flux angle is included in a setpoint value for regulating the slave flux angle of the or each slave. In the case of the or each asynchronous motor functioning as a slave, the flux angle (slave flux angle) effective there is adapted to the setpoint value by means of the regulation functionality (flux angle regulation) of the flux angle regulator; by means of the regulation functionality of the flux angle regulator, the slave flux angle can be adapted to the setpoint value based on the master flux angle.

The master flux angle is included, for example, in the setpoint value of the flux angle regulation, in that the master flux angle is adopted as the setpoint value for the flux angle regulation (setpoint value=master flux angle).

The above-mentioned object is also achieved with a control facility for controlling a method performed with a system comprising at least two mechanically coupled asynchronous motors, wherein the control facility operates according to the method as described here and hereinafter and, for this purpose, comprises means for performing the method, in particular a flux angle regulator. The method described hereinafter is preferably implemented for automatic execution in the form of a computer program (flux angle regulation computer program); the flux angle regulation computer program is an implementation of this method in software. The invention thus also relates, on the one hand, to a computer program having program code instructions that can be executed by a computer and, on the other hand, to a storage medium having such a computer program, that is to say a computer program product having program code means, and finally also a control facility, in the memory of which such a computer program is loaded or can be loaded as means for performing the method and its embodiments.

If method steps or method sequences are described hereinafter, this relates to actions which take place on the basis of the flux angle regulator or the flux angle regulation computer program or under the control of the flux angle regulator or flux angle regulation computer program, unless it is expressly indicated that individual actions are initiated by a user. At least, each use of the term "automatically" means that the action concerned takes place on the basis of the flux angle regulator or the flux angle regulation computer program or under the control of the flux angle regulator or flux angle regulation computer program.

Instead of a computer program with individual program code instructions, the implementation of the method described here and hereinafter can also take place in the form of firmware. It is clear to the person skilled in the art that instead of an implementation of a method in software, an implementation in firmware or in firmware and software or in firmware and hardware is also possible. Therefore, for the description presented here, the term software or the term flux angle regulation computer program should also include other implementation options, namely in particular an implementation in firmware or in firmware and software or in firmware and hardware.

For the further description, in order to avoid unnecessary repetition, it is of course also true that features and details which are described in connection with the aforementioned method for flux angle regulation and any embodiments also apply in connection with and with regard to the flux angle regulator intended for performance of the method, or a system having at least two mechanically coupled asynchronous motors in which such a flux angle regulator is assigned to the coupled asynchronous motors, and vice versa. Accordingly, the method can also be developed by means of individual or a plurality of method features which relate to method steps performed by the flux angle regulator, and the flux angle regulator can accordingly also be developed by means for performing method steps performed within the framework of the method, so that with respect to the disclosure, reference is always or can always be made to the individual aspects of the invention.

The advantage of the invention and its embodiments therefore, in particular, consists in that the flux angles of the mechanically coupled motors (the master and the slave or each slave are mechanically coupled) are synchronized by regulating the flux angle of the motor or each motor functioning as a slave in accordance with a setpoint value which is based on the flux angle of the motor selected as master. If the flux angle of the master (master flux angle) is used as the setpoint value of the flux angle regulation (setpoint value=master flux angle), all the motors mechanically coupled to one another within the system are operated with the same or at least essentially the same flux angle. If the master flux angle and a predetermined or predeterminable offset (flux angle offset) are used as the setpoint value of the flux angle regulation (setpoint value=master flux angle±flux angle offset), all the motors mechanically coupled to one another within the system are operated at a constant or at least essentially constant relative distance (angular distance, differential angle). The synchronization of the flux angle (the same or essentially the same flux angle; the same or essentially constant distances between the flux angles) leads to a reduction of undesirable vibrations, oscillations and the like in a mechanical system which is driven by means of the motors mechanically coupled to one another and detected by the flux angle regulation. The vibrations etc. are avoided by virtue of the fact that the flux angle regulation brings about a synchronicity of the ripples of the torques introduced into the system by each individual motor and the system is only synchronously "excited" accordingly.

The result achieved is a synchronization of the transformation angles for the motor flux of slave and master and a compensation of differences occurring in the flux angle due to the different calculation of the slip. In order to achieve this, the rotor position angle, which is copied by the master, is corrected in the slave with the aid of a flux angle regulation. The synchronicity of the flux angles is thus enforced.

Advantageous embodiments of the invention are the subject matter of the subclaims. References used here within the claims point to the further development of the subject matter of the claim referred to by the features of the respective dependent claim. They are not to be understood as dispensing with the achievement of an independent, objective protection for the features or combinations of features of a dependent claim. Furthermore, with regard to an interpretation of the claims and the description in a more detailed specification of a feature, it is to be assumed in a dependent claim that such a limitation is not present in the respective preceding claims and a more general embodiment of the method for flux angle regulation, a flux angle regulator, or a system with an implementation of the method, in particular a system with a flux angle regulator. Accordingly, any reference in the description to aspects of dependent claims is expressly to be read as a description of optional features, even without special reference. Finally, it should be pointed out that the method specified here can also be developed according to the dependent apparatus claims and vice versa.

In one embodiment of the method for flux angle regulation, a flux angle regulator, or a flux angle regulation computer program with an implementation of the method etc., it is advantageously provided that the flux angle effective at the master (master flux angle) is used as the setpoint value for regulating the flux angle of the or each slave (slave flux angle): setpoint value=master flux angle. This ensures that all the motors mechanically coupled to one another are operated at the same or at least essentially the same flux angle and thus also at the same or at least essentially the same slip frequency.

In an alternative embodiment of the method for flux angle regulation, a flux angle regulator, or a flux angle regulation computer program with an implementation of the method etc., it is advantageously provided that the flux angle (master flux angle) effective at the master plus a predetermined or predeterminable flux angle offset is used as the setpoint value for regulating the flux angle of the slave or each slave (slave flux angle): setpoint value=master flux angle±flux angle offset). This also ensures that all the motors mechanically coupled to one another are operated with the same or at least essentially the same slip frequency, and the motors mechanically coupled to one another are operated with flux angles with a constant or at least essentially constant differential angle. The differential angle resulting from this special synchronization of the flux angles leads to a phase-shifted excitation of the system driven by means of the motors mechanically coupled to one another, namely an excitation which arises on the basis of the ripples of the torques output by the individual motors. The phase-shifted excitation can advantageously be used in a targeted manner in order to cancel or at least reduce harmonics of the torque. In this respect, for example, it is possible to specify the flux angle offset (in the case of more than one motor functioning as a slave, optionally also different flux angle offsets) on the basis of a so-called tooth pitch of the motors mechanically coupled to one another, as explained below in detail by way of example in the special description part.

In the case of a very rigid coupling of the motors, it is advantageous to select the difference, resulting from the flux angle regulation, in the flux angles of the motors coupled to one another by means of a corresponding flux angle offset in such a way that the torque ripple of the motors cancels itself out or at least essentially cancels itself out. A disruptive harmonic in the torque (and odd multiples thereof) correlated with the tooth pitch of the rotor winding can be compensated for, for example, with a flux angle offset corresponding to half the tooth pitch. Application examples are multi-winding motors, segment motors, motors with a common shaft, and the like.

In the case of an elastic coupling of at least two motors mechanically coupled to one another, an opposite effect occurs compared to a very rigid coupling. This is the case, for example, with a cross cutter in which in each case one cutting blade is driven by one of the two motors mechanically coupled by means of the cutting blades. Here, the absolute accuracy during positioning plays a more subordinate role. However, it is decisive that there are no torsional moments on the cylindrical cutting blades and between the cylindrical cutting blades. Here, it is advantageous to synchronize the motors with regard to the flux angle in such a way that they have the same torque curve over time.

BRIEF DESCRIPTION OF THE DRAWING

Hereinafter, an exemplary embodiment of the invention is explained in more detail with reference to the drawing. Objects or elements corresponding to one another are provided with the same reference characters in all the figures.

The exemplary embodiment is not to be understood as a limitation of the invention. Rather, additions and modifications are also quite possible within the scope of the present disclosure, in particular those which can be obtained, for example, by combining or modifying individual features or method steps described in connection with the general or special description part and contained in the claims and/or the drawing, for the person skilled in the art with regard to the achievement of the object, and lead to a new object or to new method steps or method sequences by means of combinable features.

In the drawings:

FIG. 1 shows a cross cutter with two mechanically coupled asynchronous motors for driving the cutting blades of the cross cutter, and FIG. 2 shows a schematic view yet further simplified of a system having two mechanically coupled asynchronous motors and a flux angle regulator for synchronizing the flux angles of the asynchronous motors included in the system.

DETAILED DESCRIPTION OF PREFERRED EMBODIMENTS

Figure 1:
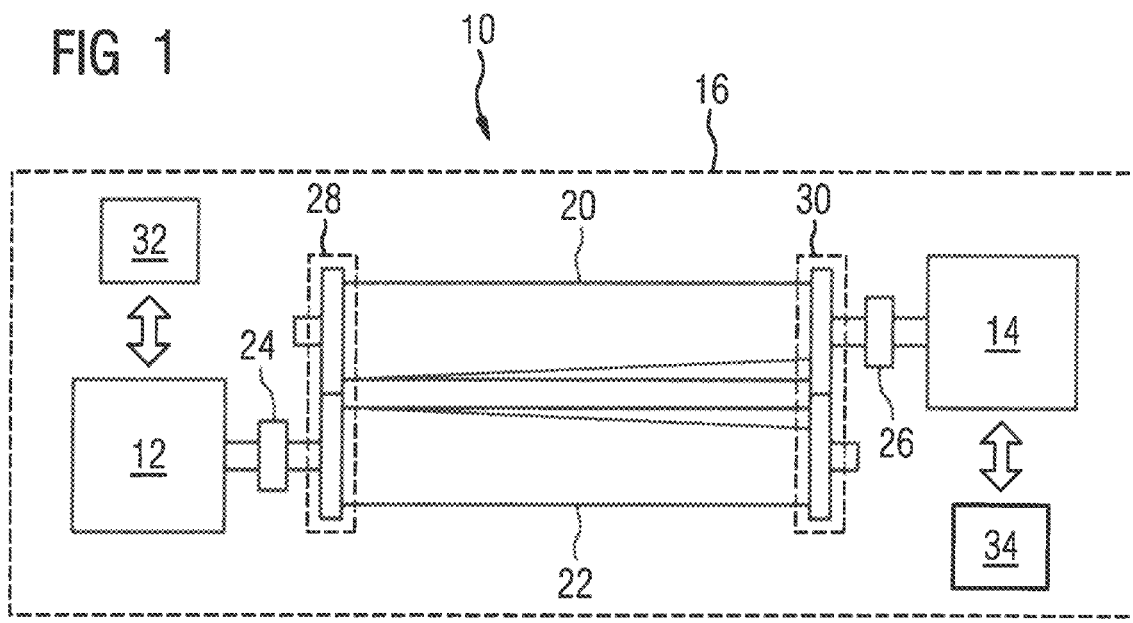

The illustration in FIG. 1 shows a so-called cross cutter 16 as an example of a system 10 having at least two mechanically coupled asynchronous motors 12, 14, hereinafter sometimes only referred to in short as motors 12, 14. A cross cutter 16 is known per se. Two rotating cutting blades 20, 22 function as the cutting apparatus, namely a so-called lower blade 20 and a so-called upper blade 22. The lower blade 20 and the upper blade 22 rotate synchronously. This is achieved by corresponding rotational speeds of the two motors 12, 14. The object to be cut or the material to be cut, for example, paper or cardboard (usually in the form of a long web), is passed between the two cutting blades 20, 22. During the cutting operation—in a manner basically known per se—the rotational speed of the cutting blades 20, 22 is coordinated with a respective feed speed of the object or material to be cut.

The details of the cross cutter 16—basically known per se—are not important, especially because the innovation proposed here can also be used for other systems 10 with at least two mechanically coupled asynchronous motors 12, 14. The illustration in FIG. 1 is accordingly limited to a greatly simplified schematic view of the two rotating cutting blades 20, 22. Each motor 12, 14 is connected to one of the cutting blades 20, 22 in each case and in this respect an axis of the respective motor 12, 14, an axis of rotation of the respective cutting blade 20, 22, in an axial extension of the respective motor axis, and between a motor axis and an adjoining axis of rotation of a cutting blade 20, 22 (basically optional) couplings 24, 26 are shown. The cutting blades 20, 22 are mechanically coupled to one another and this mechanical coupling of the cutting blades 20, 22 brings about a mechanical coupling of the motors 12, 14 driving the cutting blades 20, 22.

As an example of a mechanical coupling 28, 30 of the cutting blades 20, 22, toothed wheels, which are shown without further details and mesh with one another, each with an identical number of teeth on each cutting blade 20, 22 are shown. In the situation shown, such a coupling 28, 30 is provided on both sides of the two cutting blades 20, 22, that is to say on the side on which one of the two motors 12 acts on the cutting blade 22 driven directly by the latter, and likewise on the side on which the other motor 14 acts on the cutting blade 20 driven directly by the latter.

A drive for advancing an object to be cut or material to be cut is not shown in the illustration in FIG. 1. In this respect, it is pointed out that a cross cutter 16 and its coordination with further drives, in particular such a feed drive, is known per se.

For the purpose of such coordination, a respective rotational speed of each motor 12, 14 can usually be predefined, in particular can be regulated for at least one motor 12, 14. For this purpose, a converter 32, 34 fundamentally known per se is assigned to each motor 12, 14 and is connected upstream. The control of each motor 12, 14 by the respective converter 32, 34 connected upstream is shown in a schematic simplified manner in the illustration in FIG. 1 by means of the part of the double-sided block arrow pointing towards the motor 12, 14. The part of the double-sided block arrow pointing from the motor 12, 14 to the converter 32, 34 represents data acquisition for the motor 12, 14 which takes place, for example, within the framework of a regulation and for a regulation, and the transmission of such data to the converter 32, 34.

The further description is continued—without sacrificing any further general validity—using the example of a cross cutter 16 as a system 10 with at least two mechanically coupled motors 12, 14 (asynchronous motors, induction motors). However, the innovation proposed here is expressly not limited to such an application and accordingly, whenever a cross cutter 16 is mentioned, a basically arbitrary system 10 with at least two mechanically coupled motors 12, 14 can also be read and whenever specific details of a cross cutter 16 are mentioned, these should be considered unwritten with respect to the suitability of the innovation for basically any systems 10.

Figure 2:
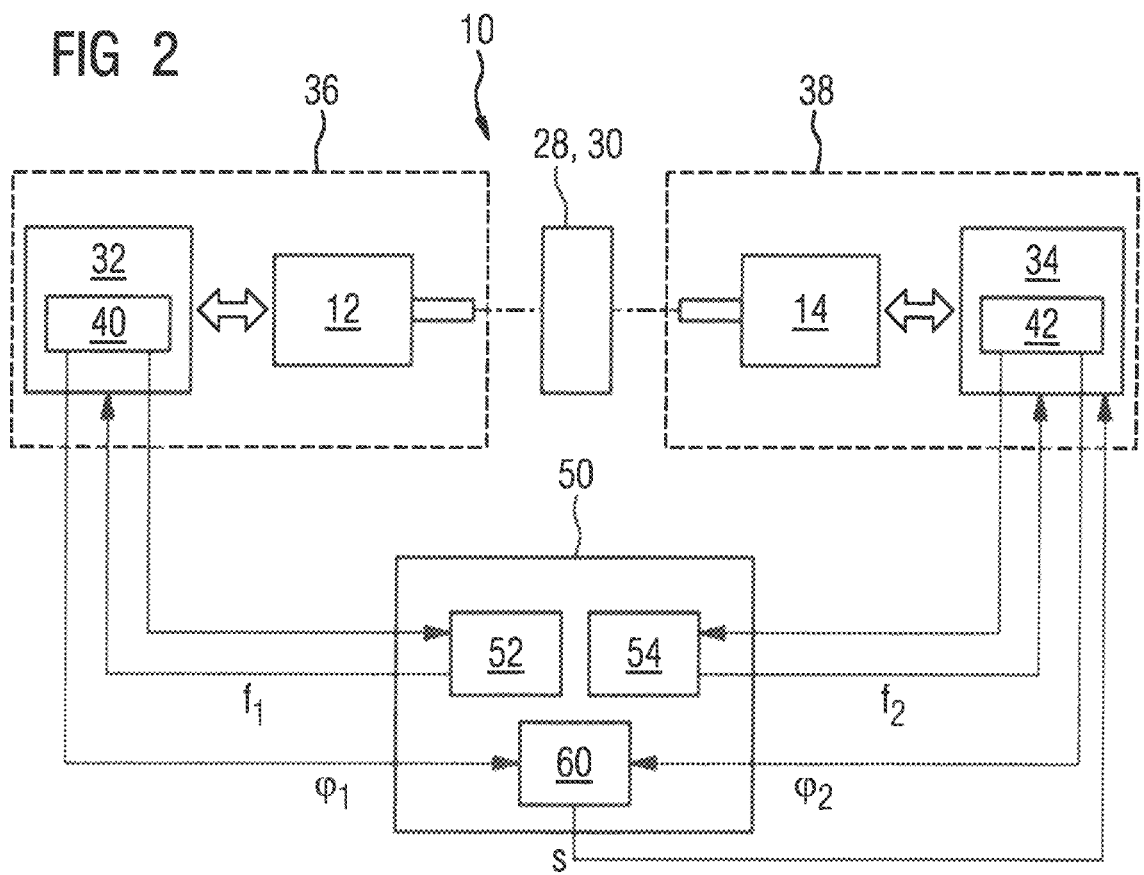

FIG. 2 shows the system 10 according to FIG. 1—or generally a system 10 having at least two motors 12, 14 mechanically coupled to one another (coupling 28, 30)—in a further simplified schematic view. The motors 12, 14 are referred together with the respective converters 32, 34 connected upstream as drives 36, 38.

The motors 12, 14 are controlled, regulated and/or monitored by means of a control and/or monitoring unit hereinafter referred to as a control unit 50 which, for example, has its own regulator 52, 54 (for example, a current regulator) for each motor 12, 14 or each drive 36, 38. For example, a device such as that offered by the applicant under the name Sinumerik, Simotion, or a type class S7 programmable logic controller of the applicant or a device with a comparable functionality functions as the control unit 50.

The control unit 50 is a control unit 50 of the cross cutter 16. In a general system 10, instead of a cross cutter 16, the control unit 50 is a control unit 50 of the system 10 or a control unit 50 of at least two of the mechanically coupled motors 12, 14 included in the system 10.

On the basis of a current regulation or the like—alternatively in principle on the basis of any other type of regulation: torque regulation, rotational speed regulation, speed regulation, etc.—a manipulated variable is output to the respective drive 36, 38, in particular a respective converter 32, 34 by means of the control unit 50, in particular by means of a regulator 52, 54 which is included therein and assigned to a motor 12, 14. In the illustration in FIG. 2, the output manipulated variables are denoted symbolically by $f_1$ and $f_2$ and denote the frequency of the phase voltages generated by means of a converter 32, 34 and output to a respectively assigned motor 12, 14.

According to the innovation proposed here, it is provided that for each drive 36, 38, in particular for each motor 12, 14, by means of a sensor system 44, 46 in principle known per se, by reading out internal operands of the respective converter 32, 34 or by means of a model calculation, a so-called flux angle $\varphi_1$, $\varphi_2$ or a measure for such a flux angle acting during operation is detected. For this purpose, two functional units denoted by the reference numerals 40, 42 are shown in the illustration in FIG. 2. These represent the different detection options and symbolize, for example, a sensor system, access to a memory of the respective converter 32, 34 and the readout of the flux angles $\varphi_1$, $\varphi_2$ there or access to a memory of the respective converter 32, 34 and a model calculation there, as well as the readout of the flux angles $\varphi_1$, $\varphi_2$ from the data of the model calculation.

According to the innovation proposed here, in addition to the detection of the flux angle or a measure for the flux angle of each motor 12, 14, it is furthermore provided that, in addition to, for example, a rotational speed regulation as described above, a superimposed regulation with regard to the flux angle (flux angle regulation) and/or a superimposed regulation with regard to the slip takes place.

Such a regulation is also implemented, for example, as a functionality of the control unit 50. Insofar, in the illustration in FIG. 2, as an example of the functionality encompassed by the control unit 50, a regulator designated as a flux angle regulator 60 for differentiation is shown. This can be implemented, for example, as a PI regulator or a PID regulator. The function of the flux angle regulator 60 is preferably, but nevertheless in principle optionally, implemented in software. Such software is then loaded as a computer program 60 into a memory, for example, a memory of the control unit 50, and is executed during operation of the system 10 by means of a processing unit in the form or manner of a microprocessor, for example, a processing unit comprised by the control unit 50, in particular a microprocessor, ASIC or the like.

In the illustration in FIG. 2, the reference numeral 60 denotes either a flux angle regulator 60 implemented in hardware or a flux angle regulator 60 implemented in software. A flux angle regulator 60 implemented in software is referred to herein and hereinafter in short as computer program (flux angle regulation computer program) 60, such that the reference numeral 60 is used both for the flux angle regulator 60 and for a computer program 60 with an implementation of the function of the flux angle regulator 60.

In the regulation of the flux angle (flux angle regulation), it is provided that one of the at least two motors 12, 14 of the system 10 is selected as the relevant motor 12. The relevant motor 12 is referred to hereinafter as the master 12. Which of the at least two motors 12, 14 of the system 10 is selected as the master 12 is basically arbitrary. The motor 14 or any other motor 14 is correspondingly a motor 14 (slave 14) following the motor 12 (master 12).

In the regulation of the flux angle, it is provided that, in the case of the motor 12 selected as master 12, the flux angle effective there—master flux angle—is detected in a continuous or quasi-continuous manner (scanning), that is to say in particular is detected, calculated or read out by sensors (functional units 40, 42), and the respective effective flux angle of the master 12 is used as a setpoint value for regulating the flux angle of the or each slave 14—slave flux angle.

Such a regulation of the slave flux angle or of each slave flux angle is brought about by means of the flux angle regulator 60. This detects the effective flux angle of the master 12 and the effective flux angle of the or each slave 14, uses the effective flux angle of the master 12 as the basis for a setpoint value of a regulation and the effective flux angle of the slave 14 or of a slave 14 as the actual value of the regulation and indicates a manipulated variable resulting from the regulation (symbolically referred to in the illustration in FIG. 2 by "s") to the respective slave 14, in particular its converter 34. Using the terms master flux angle and slave flux angle, the flux angle regulator 60 detects the master flux angle and the slave flux angle or each slave flux angle, uses the master flux angle as the basis for a setpoint value of a regulation and the slave flux angle or each slave flux angle as the actual value of in each case one regulation and outputs a manipulated variable s resulting from the regulation to the respective slave 14, in particular its converter 34.

With regard to the detection of the flux angles (master flux angle, slave flux angle) and the scope of the term "detection", reference is made to the preceding explanations and the explanations in the introduction to the description. Accordingly, the term "detect" includes, in particular, metrological/sensory detection (by means of a corresponding sensor system), a calculation (for example, on the basis of a model calculation) or a readout of internal operands of a converter 32, 34 connected upstream of the respective motor 12, 14 and detection takes place, for example, by means of the functional units 40, 42 shown in a schematically simplified view in FIG. 2.

In the case of a field-oriented regulation of an asynchronous motor 12, 14, the flux angle is calculated from the current rotor position and the integral of the slip frequency. So that an asynchronous motor 12, 14 can generate a torque, a relative speed between the stator field and the rotor position is necessary. This leads to so-called slip and a slip frequency. The field-oriented regulation or the so-called park-transformation does not know speeds. One option for calculating the transformation angle corresponding to the flux angle is to calculate the transformation angle from the current rotor position angle and the integral of the slip frequency (produces an offset angle) by means of a model calculation. When the flux angle is detected by reading out internal operands of a respective converter 32, 34, for example, the current rotor position angle and the slip frequency (or directly the integral of the slip frequency) are read out and the flux angle calculated therefrom.

In the case of the slave 14 or each slave 14, the flux angle regulator 60 optionally influences at least one of the following manipulated variables s: slip angle, rotor position angle, torque setpoint value and magnetization current.

The regulation of the flux angle does not necessarily have to aim to match the effective flux angle of the or each slave 14 with the effective flux angle of the master 12. Alternatively, it can also be provided that a constant relative distance between the effective flux angle of the master 12 and the effective flux angle of the or each slave 14 is sought by means of the regulation. Then, during flux angle regulation, the effective flux angle of the master 12 is accordingly not used as a setpoint value for the regulation, but rather the effective flux angle of the master 12 is increased or decreased by a predetermined or predeterminable offset (flux angle offset). A possible flux angle offset can be predetermined, for example, in the form of parameterization of the flux angle regulator 60 or parameterization of the control unit 50. Optionally, it can also be provided that a possible flux angle offset can be predefined dynamically by means of a potentiometer or the like, in particular on the flux angle regulator 60 or on the control unit 50.

A value which results from a so-called tooth pitch of the stator of the motors 12, 14 or one of the motors 12, 14 of the respective system 10 is preferably used as the flux angle offset. A stator with three pole pairs has twelve so-called teeth carrying windings which are distributed equidistantly along a complete circumference in a manner known per se. Each tooth thus has an angular distance of exactly 30° to each immediately adjacent tooth. Half the tooth pitch in such a configuration results in the value 15° and this can be predetermined, for example, as a flux angle offset. The gaps between the teeth do not conduct any magnetic flux, and therefore location-dependent preferred positions are produced for the magnetic flux, which generate harmonics in the torque. These are avoided or at least reduced by specifying the flux angle offset which matches the tooth pitch.

Regulating the flux angle (flux angle regulation) ensures that the flux angles of the motors 12, 14 comprised by the system 10 have a defined differential angle (possibly 0°)—flux angle synchronization—and the motors 12, 14 are therefore also operated with the same slip frequency.

In the case of motors 12, 14 of identical construction, a different slip frequency results, for example, when the rotor resistance deviates as a result of temperature differences. As a result of the synchronization of the flux angle (by means of the flux angle regulation), a slightly different torque can be set in the motors 12, 14 comprised by the system 10. These differences can either stabilize because the reduction in torque counteracts the difference in temperature, or they can be actively compensated for using additional measures, for example an increase or reduction in the magnetizing current.

Although the invention has been illustrated and explained in more detail by the exemplary embodiment, the invention is not limited by the disclosed example or examples and other variations can be derived therefrom by a person skilled in the art without departing from the scope of the invention.

Individual aspects of the description submitted here can therefore be summarized as follows: a method is specified for operating a system 10 comprising at least two mechanically coupled asynchronous motors 12, 14, a computer program 60 having an implementation of the method and a system operating in accordance with the method 10, wherein in the case of a motor 12 selected as a master 12, a flux angle effective there is detected, is used as basis for a setpoint value of a regulation of the flux angle of each other motor 14 of the system 10 and the flux angle of each other motor 14 is adapted to the setpoint value within the scope of the regulation.

Instead of two individual mechanically coupled motors 12, 14, a single motor with separate windings (double-winding motor) can also be used. What has been said above for two individual motors 12, 14 then applies accordingly to the two functional units of the double-winding motor. Likewise, in a generalization of the approach proposed here to more than two mechanically coupled motors 12, 14, instead of the plurality of individual motors 12, 14 mechanically coupled to one another, a so-called multi-winding motor can also be used. The same then applies accordingly to the functional units of such a multi-winding motor as to the respective individual motors 12, 14 mechanically coupled to one another.

The invention claimed is:

1. A method for operating a system having at least two mechanically coupled asynchronous motors, the method comprising
   selecting one of the at least two asynchronous motors as master to operate during operation of the system as master,
   measuring an effective flux angle of the master as a master flux angle in a continuous or quasi-continuous manner;
   operating, during the operation of the system, others of the at least two asynchronous motors as slaves;
   including the master flux angle in a setpoint value for regulating the flux angle of the slaves; and
   using the master flux angle as the setpoint value for regulating the flux angle of the slaves.

2. The method of claim 1, further comprising using the master flux angle plus a predetermined or predeterminable flux angle offset as the setpoint value for regulating the flux angle of the slaves.

3. A system, comprising:
   at least two mechanically coupled asynchronous motors, wherein during operation, one of the at least two asynchronous motors is selected as a master and functions as the master, while another of the at least two asynchronous motors functions as a slave, and
   a computer program product embodied on a non-transitory computer-readable medium and comprising program code, which when loaded into a memory of the system and executed by a processor of the system, causes the processor to execute a method as set forth in claim 1.

4. The system of claim 3, comprising precisely two of said mechanically coupled asynchronous motors, with one of the two asynchronous motors driving a lower blade and the other of the two asynchronous motors driving an upper blade of a cross cutter.

5. A computer program product for regulating a flux angle of an asynchronous motor in a system comprising at least two mechanically coupled asynchronous motors, the computer program product embodied on a non-transitory computer-readable medium and comprising program code, which when loaded into a memory of the system and executed by a processor of the system, causes the processor to
   select and operate during operation of the system, one of the at least two asynchronous motors as master,
   measure an effective flux angle of the master as a master flux angle in a continuous or quasi-continuous manner,
   operate, during the operation of the system, others of the at least two asynchronous motors as slaves,
   include the master flux angle in a setpoint value for regulating the flux angle of the slaves, and
   use the master flux angle as the setpoint value for regulating the flux angle of the slaves.

6. A flux angle regulator for synchronizing a flux angle of at least two mechanically coupled asynchronous motors, wherein during operation, one of the at least two asynchronous motors is selected as a master and functions as the master, while another of the at least two asynchronous motors functions as a slave, wherein the flux angle regulator is configured to:
   measure an effective flux angle of the master as a master flux angle in a continuous or quasi-continuous manner,
   include the master flux angle in a setpoint value for regulating the flux angle of the slave, and
   adjust the flux angle of the slave to the setpoint value during the operation.

7. A system, comprising:
   at least two mechanically coupled asynchronous motors, wherein during operation, one of the at least two asynchronous motors is selected as a master and functions as the master, while another of the at least two asynchronous motors functions as a slave, and
   a flux angle regulator as set for the in claim 6.

8. The system of claim 7, comprising precisely two of said mechanically coupled asynchronous motors, with one of the two asynchronous motors driving a lower blade and the other of the two asynchronous motors driving an upper blade of a cross cutter.

9. A system, comprising:
   precisely one multi-winding motor having separate windings, and
   a plurality of mechanically coupled functional units commensurate with a number of separate windings,
   wherein during operation, one of the at least two separate windings is selected as a master and functions as the master, while another of the separate windings functions as a slave, and
   a flux angle regulator or a computer program product embodied on a non-transitory computer-readable medium and comprising program code, which when loaded into a memory of the system and executed by a processor of the system, causes the processor to emulate the flux angle regulator, wherein the flux angle regulator is configured as set forth in claim 6.

* * * * *